United States Patent [19]

Ruff

[11] Patent Number: 5,252,307

[45] Date of Patent: Oct. 12, 1993

[54] METHOD OF PROCESSING CHLOROSILANE DISTILLATION RESIDUES WITH STEAM

[75] Inventor: Klaus Ruff, Troisdorf, Fed. Rep. of Germany

[73] Assignee: Hüls Aktiengesellschaft, Marl, Fed. Rep. of Germany

[21] Appl. No.: 944,367

[22] Filed: Sep. 14, 1992

[30] Foreign Application Priority Data

Sep. 17, 1991 [DE] Fed. Rep. of Germany ....... 4130880
Sep. 17, 1991 [DE] Fed. Rep. of Germany ....... 4130881

[51] Int. Cl.$^5$ ..................... C01B 33/08; C01B 33/107
[52] U.S. Cl. ................................... 423/342; 423/348; 423/488; 588/226; 588/248
[58] Field of Search ............... 423/341, 342, 343, 348, 423/488; 588/226, 248

[56] References Cited

U.S. PATENT DOCUMENTS

| 3,878,291 | 4/1975 | Keller et al. | 423/341 |
| 5,066,472 | 11/1991 | Ruff et al. | 423/342 |
| 5,182,095 | 1/1993 | Ruff | 423/659 |

FOREIGN PATENT DOCUMENTS 3642285 6/1988 Fed. Rep. of Germany .
3742614 6/1989 Fed. Rep. of Germany .
2162364 7/1973 France .

Primary Examiner—Olik Chaudhuri
Assistant Examiner—Ken Horton
Attorney, Agent, or Firm—Felfe & Lynch

[57] ABSTRACT

A method for processing chlorosilane distillation residues by hydrolysis with steam, in which the hydrolysis is carried out at escalating temperatures from about 130° C. to at least 170° C.

4 Claims, No Drawings

METHOD OF PROCESSING CHLOROSILANE DISTILLATION RESIDUES WITH STEAM

FIELD OF THE INVENTION

The present invention relates to a novel method of processing chlorosilane distillation residues by hydrolysis with steam accompanied by the release of hydrogen chloride.

BACKGROUND OF THE INVENTION

Chlorosilanes such as trichlorosilane and silicon tetrachloride can be prepared, for example, by reacting crude silicon with chlorine or hydrogen chloride. In the case of an industrial scale preparation, types of crude silicon whose silicon content is 85% by weight or more are usually employed as starting materials. Other constituents of crude silicon are mainly iron, aluminum, calcium and titanium, which are converted into their chlorides during the reaction with chlorine or hydrogen chloride. In addition to these metal chlorides, high-boiling compounds such as hexachlorodisiloxane and pentachlorodisiloxane are also produced.

Customarily, these residues are coarsely separated from the chlorosilanes by distillation. Depending upon the distillation conditions, the distillation residue is left behind in the form of a suspension or as a solid, which must be subjected to a special processing procedure prior to environmentally compatible disposal thereof.

The distillation of the chlorosilanes is carried out as completely as possible, because any chlorosilanes which remain in the distillation residue can no longer be converted into useful products and therefore represent a loss in value. A substantially evaporated distillation residue has a typical composition of about 80% by weight of aluminum and iron chlorides, 16% by weight of hexachlorodisiloxane, pentachlorodisiloxane and titanium tetrachloride, and 4% by weight of silicon tetrachloride.

German Auslegeschrift No. 21 61 641 discloses a method wherein the distillation residue from a chlorosilane production is poured into a heatable paddle dryer, chlorosilanes are driven off at the appropriate temperature accompanied by agitation of the dryer contents, and after drying of the solids is complete, steam is blown into the paddle dryer to effect the hydrolysis. The disadvantage of such a batch process is that the hydrolysis residue cannot be completely removed from the mixer after the hydrolysis is complete, so that hydrolysis residue remains on the walls and the paddles, which reacts with a new charge of chlorosilane-containing suspension to form hard, crust-like deposits which gradually clog the hydrolysis reactor and greatly impair the functioning of the shut-off devices which are required for the drying and hydrolysis process steps.

German Patent No. 36 42 285 discloses a batch process wherein the drying and hydrolysis steps are performed in two different apparatuses at different temperatures, where drying takes place at a lower temperature and the hydrolysis is effected at a higher temperature. In order to minimize the proportion of aluminum chloride in the distillate during drying, the drying temperature should not significantly exceed 130° to 140° C. On the other hand, effective hydrolysis requires temperatures of 170° C. and higher, since increasing temperatures naturally lead to better hydrolysis reactions.

The process described in this German patent also has certain drawbacks, because the jump in temperature which the treated residue undergoes when the drying step turns into the hydrolysis step leads to flash evaporation of a portion of the residue, whereby the hydrolysis reaction takes place partly in the gaseous phase and the hydrolysis products are carried out of the reactor together with the exhaust gas due to their low weight. The separation of the solids from the exhaust gas stream containing hydrogen chloride and unconverted steam is complicated. If dust filters are used, they must be specially equipped to avoid condensation of hydrochloric acid, and the service life of the filter cloth is short due to a tendency to clog. If, on the other hand, scrubbers are used, the solid must be separated mechanically from the hydrochloric acid and must then be subjected to an after-treatment, for example drying, because it cannot be disposed of in landfills in its untreated form, namely moistened with hydrochloric acid.

The procedure described in German Auslegeschrift No. 21 61 641 also leads to a high discharge of solids by way of the gaseous phase which leaves the hydrolysis.

OBJECTS OF THE INVENTION

It is an object of the present invention to provide a process which does not have the disadvantages described above, especially a process which operates economically and in which only little solid is discharged together with the gas stream leaving the hydrolysis reactor.

Other objects and advantages of the present invention will become apparent as the description thereof proceeds.

DESCRIPTION OF THE INVENTION

If the hydrolysis is carried out batchwise, the object of the present invention is achieved by performing the drying and hydrolysis steps in separate apparatuses, namely by filling the pre-dried residue batchwise into a hydrolysis reactor whose initial temperature is at least 5° C. lower than the drying temperature, feeding in steam while heating to the hydrolysis temperature at the rate of at least 0.2 kg/h per kg of initially introduced residue if the temperature is less than 170° C., and increasing the rate of steam introduction to at least 0.3 kg/h per kg of initially introduced residue from 170° C. onwards.

The hydrolysis reactor does not need to meet any particular requirements. Any heatable mixing apparatus is suitable.

In order to minimize the discharge of solids with the gaseous phase, heating of the residue to the hydrolysis temperature must be accompanied by the introduction of steam. However, an oversupply of steam at low temperatures leads to incomplete steam conversion, since hydrolysis at higher temperatures is naturally more efficient. The amount of unconverted steam must be minimized so as not to unnecessarily dilute the hydrogen chloride, which makes its work-up more difficult. After the work-up, for example in an absorption / desorption treatment, the hydrogen chloride can be recycled into the main process for the hydrochlorination of silicon.

In the case of a continuous operation the above object is achieved in accordance with the present invention by starting the hydrolysis at a temperature of no more than 160° C. and terminating it at a temperature of at least 170° C.

In the process of the present invention the residue preferably moves through different temperature zones in succession. The hydrolysis is started at a temperature of no more than 160° C., preferably at 130° to 140° C. The solid is then passed to reactor zones of higher temperature, preferably of at least 200° C. If necessary, the solid is cooled again in cooling zones in order to facilitate the storage which follows or to recover the heat.

The process of the instant invention is not tied to any specific reactor type. The temperature zones through which the solid being hydrolyzed moves can be arranged vertically on top of one another, where the solid falls from one temperature zone to the next by gravitation. A horizontal arrangement of the temperature zones is also possible if the solid being treated is passed through the individual temperature stages in succession by conveying means such as, for example, mixing paddles in the case of a horizontal cylindrical reactor. A combination of horizontal and vertical arrangement is also feasible. Thorough mixing of the solid in the individual temperature zones of the hydrolysis is of advantage. The thorough mixing can be effected with the aid of conventional equipment.

The introduction of steam is not subject to any limitations either. Steam can be introduced into the hydrolysis reactor by way of a single pipe connection or at several places, so as to obtain an optimum hydrolysis result by adjusting the steam temperature to the temperature of the particular hydrolysis zone.

The following examples illustrate the present invention and will enable others skilled in the art to understand it more completely. It should be understood, however, that the invention is not limited solely to the particular examples given below.

Example 1

(continuous process)

The powdery or lumpy residue of a chlorosilane distillation was continuously introduced into a laboratory paddle dryer equipped with a horizontal stirrer shaft at a rate of 300 g/h at one end of the dryer where it was reacted with steam introduced at the rate of 50 g/h. At the other end of the dryer, a bottom outlet for the hydrolysis residue was provided, and above it a gaseous outlet. The mixing device in the dryer was operated at a rotational speed such that the residence time of the solid in the mixer was 1 minute. The mixer was equipped with two heating zones; the one at the residue inlet was heated at 40° C., and the other at the outlet was heated at 220° C. A dust filter was mounted in the exhaust gas line; 5 g/h of dust were deposited on the filter.

Example 2

(comparative example, continuous process)

Example 1 was repeated. Under otherwise identical conditions the temperature of the inlet zone was increased to 200° C., and the temperature of the outlet zone remained unchanged. 60 g/h of dust were collected on the dust filter.

Example 3

(batch process)

1000 g of pre-dried distillation residue, which was previously obtained from a residue suspension by evaporation at 140° C., were filled into a 5-liter mixer at 130° C. The mixer contents were heated to 180° C. within 10 minutes at a rotational speed of the mixing device of 300 rpm while introducing steam at 160° C. at a rate of 300 g/h. After reaching the hydrolysis temperature of 180° C., the rate of addition of steam was increased to 3000 g/h, and the hydrolysis was continued for another hour. The vapors leaving the hydrolysis reactor at its top passed through a dust filter. After the hydrolysis was complete, 567 g of hydrolysis residue were obtained in the mixer, and the dust filter contained 63 g of hydrolysis residue.

Example 4

(comparative example, batch process)

Example 3 was repeated, except that the pre-dried residue was filled into a mixer heated to 180° C. into which steam was introduced at the rate of 3000 g/h. After 1 hour, 385 g of hydrolysis residue were contained in the mixer, 130 g were deposited on the dust filter, and 115 g were contained in the gas exhaust line due to filter leakage.

Example 5

(batch process)

1.5 kg of pre-dried distillation residue obtained from a residue suspension by evaporation at 158° C. were filled at 135° C. into a 10-liter mixer. The mixer temperature was increased to 230° C. over a period of 2 hours at a rotational speed of the mixing device of 40 rpm. At the beginning, steam at 190° C. was introduced at the rate of 300 g/h into the mixture and then at the rate of 450 g/h after the mixer temperature had reached 170° C. After the end of the reaction, 840 g of hydrolysis residue were found in the mixer and 50 g on the dust filter.

Example 6

(comparative example, batch process)

Example 5 was repeated, except that steam was introduced at the beginning at the rate of 150 g/h, at the rate of 250 g/h from a mixer temperature of 150° C. onwards, and at the rate of 500 g/h from a mixer temperature of 170° C. onwards. After completion of the reaction 690 g of hydrolysis residue were contained in the mixer and 200 g had deposited on the dust filter.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

I claim:

1. In a method of continuously processing a chlorosilane distillation residue by hydrolysis with steam, the improvement which comprises beginning the hydrolysis at a temperature of no more than 160° C. and terminating the hydrolysis at a temperature of at least 170° C.

2. The process of claim 1, wherein the said residue being hydrolyzed moves in succession through reaction zones of escalating temperatures.

3. The method of claim 2, wherein the said residue moves in succession through a first reaction zone at a temperature of 130° to 140° C., followed by at least one additional reaction zone at a temperature of at least 200° C.

4. In a method of batchwise processing of a chlorosilane distillation residue by hydrolysis with steam, the improvement which comprises introducing a pre-dried distillation residue into a hydrolysis reactor whose initial temperature is at least 5° C. lower than the temperature at which the said residue was predried, steam is introduced into the reactor during heating of the residue to the hydrolysis temperature at a rate of at least 0.2 kg/h per kg of initially introduced residue as long as the reactor temperature is less than 170° C., and the amount of steam introduced into the reactor is increased to at least 0.3 kg/h per kg of initially introduced residue from 170° C. onwards.

* * * * *

UNITED STATES PATENT AND TRADEMARK OFFICE
CERTIFICATE OF CORRECTION

PATENT NO. : 5,252,307
DATED : October 12, 1993
INVENTOR(S) : Klaus Ruff

It is certified that error appears in the above-indentified patent and that said Letters Patent is hereby corrected as shown below:

Column 3  Line 49  "40°C" should read --140°C--

Signed and Sealed this

Twentieth Day of September, 1994

BRUCE LEHMAN

*Attest:*

*Attesting Officer*          *Commissioner of Patents and Trademarks*